US012607294B2

(12) United States Patent
Kang

(10) Patent No.: US 12,607,294 B2
(45) Date of Patent: Apr. 21, 2026

(54) ROTATING BASE AND IMAGE CAPTURING MODULE

(71) Applicant: Chicony Electronics Co., Ltd., New Taipei City (TW)

(72) Inventor: Wei Xun Kang, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 134 days.

(21) Appl. No.: 18/443,322

(22) Filed: Feb. 16, 2024

(65) Prior Publication Data

US 2025/0172233 A1 May 29, 2025

(30) Foreign Application Priority Data

Nov. 29, 2023 (TW) .................................. 112146190

(51) Int. Cl.
*F16M 11/20* (2006.01)
*G03B 17/02* (2021.01)

(52) U.S. Cl.
CPC ......... *F16M 11/2078* (2013.01); *G03B 17/02* (2013.01)

(58) Field of Classification Search
None
See application file for complete search history.

(56) References Cited

U.S. PATENT DOCUMENTS 9,436,067 B2 * 9/2016 Chen .................... G03B 17/561
12,126,152 B2 * 10/2024 Donatelli ............. H02G 15/013

2002/0051640 A1 * 5/2002 Arbuckle ............... G03B 17/02
396/535
2007/0297788 A1 * 12/2007 Wahl ...................... H04N 23/51
396/419
2012/0291220 A1 * 11/2012 Okuhara ............. B60R 16/0222
16/2.2

(Continued)

FOREIGN PATENT DOCUMENTS

CN 111322499 6/2020
CN 111322499 A * 6/2020 ............. F16M 11/22

(Continued)

OTHER PUBLICATIONS

"Office Action of Taiwan Counterpart Application", issued on Jul. 10, 2025, p. 1-p 5.

(Continued)

*Primary Examiner* — Rodney E Fuller
(74) *Attorney, Agent, or Firm* — JCIPRNET

(57) ABSTRACT

A rotating base includes a first housing, a second housing, a rotating assembly, at least one sealing member and an electronic cable. The rotating assembly is connected between the first housing and the second housing. The sealing member includes a main part and a tube-shaped part, wherein the main part is disposed between at least one of the first housing and the second housing and the rotating assembly. The tube-shaped part is connected to the main part. The electronic cable is extended to an internal of the second housing from an internal of the first housing through the rotating assembly, wherein the electronic cable is disposed through the tube-shaped part and pressed tightly to an interior wall of the tube-shaped part. An image capturing module is also provided.

20 Claims, 6 Drawing Sheets

(56)                    References Cited

U.S. PATENT DOCUMENTS

2015/0168815  A1 *    6/2015   Chen .................... F16M 13/027
                                                       396/427
2020/0161848  A1 *    5/2020   Bielen ................. G01D 11/245

FOREIGN PATENT DOCUMENTS

CN          217108977        8/2022
CN          217108977  U   *   8/2022
EP            1008973  A1 *   6/2000    ............. H04N 23/51
EP            3246615  A1 *  11/2017    ....... G08B 13/19617
WO      WO-2022177601  A1 *   8/2022    ............. H04N 23/57
WO      WO-2023282690  A1 *   1/2023    ........... F16M 13/027

OTHER PUBLICATIONS

"Office Action of Taiwan Counterpart Application", issued on Sep. 19, 2024, p. 1-p. 10.

* cited by examiner

100

10

120

130

110

ROTATING BASE AND IMAGE CAPTURING MODULE

CROSS-REFERENCE TO RELATED APPLICATION

This application claims the priority benefit of Taiwan application serial no. 112146190, filed on Nov. 29, 2023. The entirety of the above-mentioned patent application is hereby incorporated by reference herein and made a part of this specification.

BACKGROUND

Technical Field

The application relates to a base and an image capturing module, and in particular, to a rotating base and an image capturing module having the same.

DESCRIPTION OF RELATED ART

Generally speaking, in order for the outdoor monitors to function normally for a long time, the outdoor monitors must have good waterproof properties. However, when the outdoor monitor is divided into two housings to increase mobility and the two housings are connected by a rotating shaft, water or water vapor can easily enter the interior of the two housings through the gap between the rotating shafts, causing damage to the circuit board inside the housing. Conventional outdoor monitors use glue to bond the joints of components to achieve a waterproof effect, but this makes it difficult to disassemble, assemble, and rework the outdoor monitors. Therefore, how to take into account the waterproof properties and reworkability of outdoor monitors is an issue that is being discussed in this field.

SUMMARY

The present invention provides a rotating base and an image capturing module, which have good waterproof properties and reworkability.

A rotating base of the present invention includes a first housing, a second housing, a rotating assembly, at least one sealing member and an electronic cable. The rotating assembly is connected between the first housing and the second housing. The sealing member includes a main part and a tube-shaped part, wherein the main part is disposed between at least one of the first housing and the second housing and the rotating assembly. The tube-shaped part is connected to the main part. The electronic cable is extended to an internal of the second housing from an internal of the first housing through the rotating assembly, wherein the electronic cable is disposed through the tube-shaped part and pressed tightly to an interior wall of the tube-shaped part.

An image capturing module of the present invention includes the above-mentioned rotating base and an image capturing unit. The image capturing unit is disposed on the first housing.

In an embodiment of the present invention, the above-mentioned at least one sealing member includes two sealing members. One sealing member is disposed between the first housing and the rotating assembly, and the other sealing member is disposed between the second housing and the rotating assembly.

In an embodiment of the present invention, the above-mentioned electronic cable is adapted to be passed through the tube-shaped part of one sealing member and the tube-shaped part of the other sealing member along a passing direction, and the tube-shaped part of each sealing members extends from the main part along the passing direction.

In an embodiment of the present invention, the above-mentioned main part is sealed to a gap between the rotating assembly and the first housing.

In an embodiment of the present invention, a connecting end of the above-mentioned rotating assembly is connected to the second housing, and the main part is sealed to a gap of the connecting end of the rotating assembly.

In an embodiment of the present invention, the above-mentioned main part has at least one annular flange. The at least one annular flange surrounds the tube-shaped part and is compressed by at least one of the first housing and the rotating assembly.

In an embodiment of the present invention, the above-mentioned at least one annular flange comprises two annular flanges. The two annular flanges are arranged concentrically.

In an embodiment of the present invention, the above-mentioned main part has an annular groove. The annular groove surrounds the tube-shaped part.

In an embodiment of the present invention, the above-mentioned rotating base further includes at least one fastener, wherein the first housing and the rotating assembly are fastened to each other through the at least one fastener. The main part has at least one through hole, and the at least one fastener passes through the at least one through hole.

In an embodiment of the present invention, the above-mentioned main part has at least one through hole. The rotating assembly has at least one positioning post, and the at least one positioning post is disposed at the at least one through hole.

In an embodiment of the present invention, the above-mentioned rotating assembly comprises a fixed structure and a rotating member. The rotating member is fixed to the first housing. The fixed structure is fixed to the second housing. The rotating member is movably connected to the fixed structure.

In an embodiment of the present invention, the main part of the above-mentioned at least one sealing member is disposed between the first housing and the rotating member.

In an embodiment of the present invention, the above-mentioned the main part of the above-mentioned at least one sealing member is disposed on the fixed structure.

In an embodiment of the present invention, the above-mentioned fixed structure has a ball joint slot. The rotating member has a ball joint head. The ball joint head is connected to the ball joint slot in a ball joint manner.

In an embodiment of the present invention, the above-mentioned fixed structure comprises a base and an abutting structure. The rotating member is movably connected to the base. The abutting structure is disposed between the second housing and the base and pushes the base toward the rotating member along a first direction.

In an embodiment of the present invention, the above-mentioned abutting structure comprises a first pressing block and a second pressing block. The first pressing block is movably disposed between the base and the second pressing block along a second direction and has a first inclined surface inclined to the second direction. The second pressing block has a second inclined surface parallel to and bearing on the first inclined surface. The first pressing block is adapted to move along the second direction to cause the first inclined surface to move along the second inclined surface, thereby changing the abutting force of the abutting structure against the base along the first direction.

In an embodiment of the present invention, the above-mentioned rotating assembly further comprises a housing and an adjusting member. The adjusting member is rotatably arranged in the housing and screwed on the first pressing block, and the adjusting member is adapted to rotate and drive the first pressing block to move along the second direction.

In an embodiment of the present invention, the above-mentioned fixed structure further comprises a fixed plate. The fixed plate is fixed to the second housing. One end of the abutting structure towards the base, and the fixed plate stops the other end of the abutting structure.

In an embodiment of the present invention, the above-mentioned fixed structure further comprises a fixed piece. The fixed piece is fixed to the fixed plate. The main part of the at least one sealing member is sealed to the fixed piece and the fixed plate.

Based on the above, in the rotating base of the present invention, the sealing member is disposed between the first housing and/or the second housing and the rotating assembly, and the sealing member has the tube-shaped part used to cover the electronic cable. Therefore, the tight combination of the electronic cable and the tube-shaped part can prevent external water from entering the first housing and the second housing, thereby making the rotating base have good waterproof properties. In addition, since the rotating base is waterproofed by setting the sealing member rather than in a gluing manner, it is easy to disassemble and rework.

DESCRIPTION OF THE EMBODIMENTS

Figure 1:
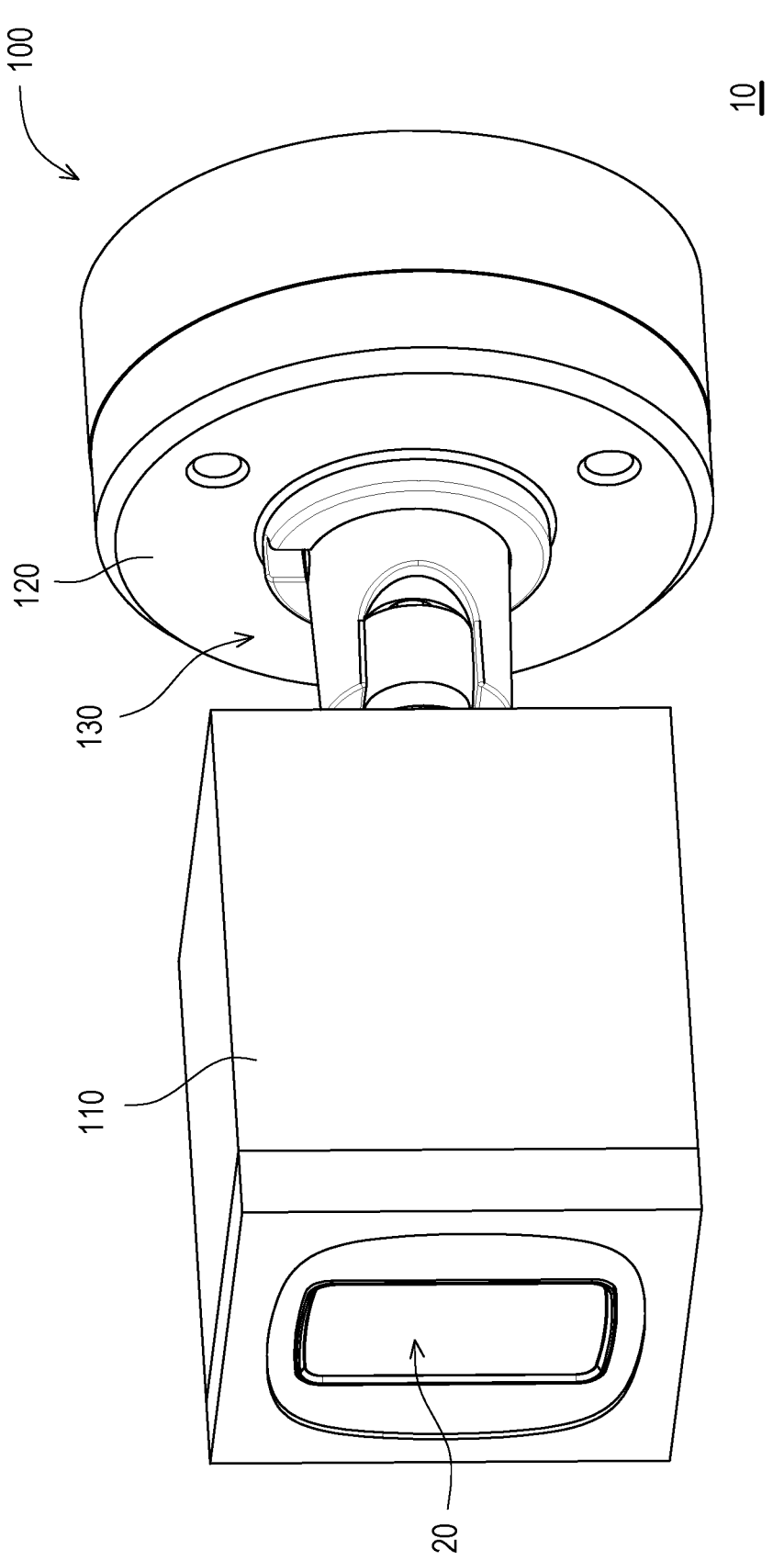
FIG. 1 is a perspective view of an image capturing module according to an embodiment of the present invention.

For the convenience and clarity of explanation, the thickness or size of each element in the drawings is expressed in an exaggerated, omitted, or schematic manner for the understanding and reading of person with ordinary skill in the art. Moreover, the size of each component is not entirely its actual size, and is not used to limit the conditions for the implementation of the present invention, so it has no technical substantive significance. Any structural modifications, changes in proportions or adjustments in size should still fall within the scope of the technical content disclosed in the present invention without affecting the effects that the present invention can produce and the purposes that can be achieved. Throughout the drawings, the same reference numbers may refer to the same or similar components.

Figure 2:
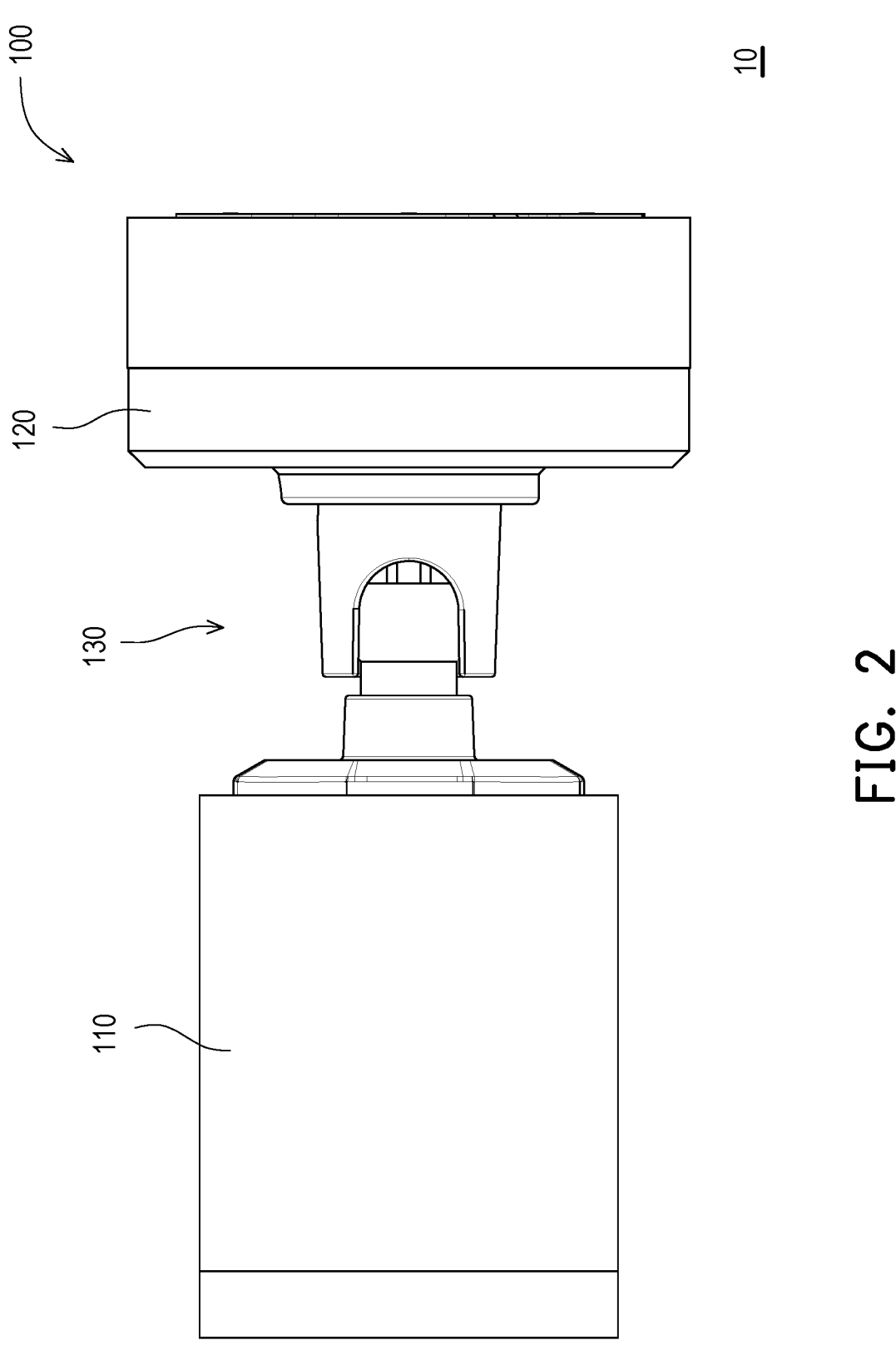
FIG. 2 is a side view of the image capturing module of FIG. 1.
Figure 3:
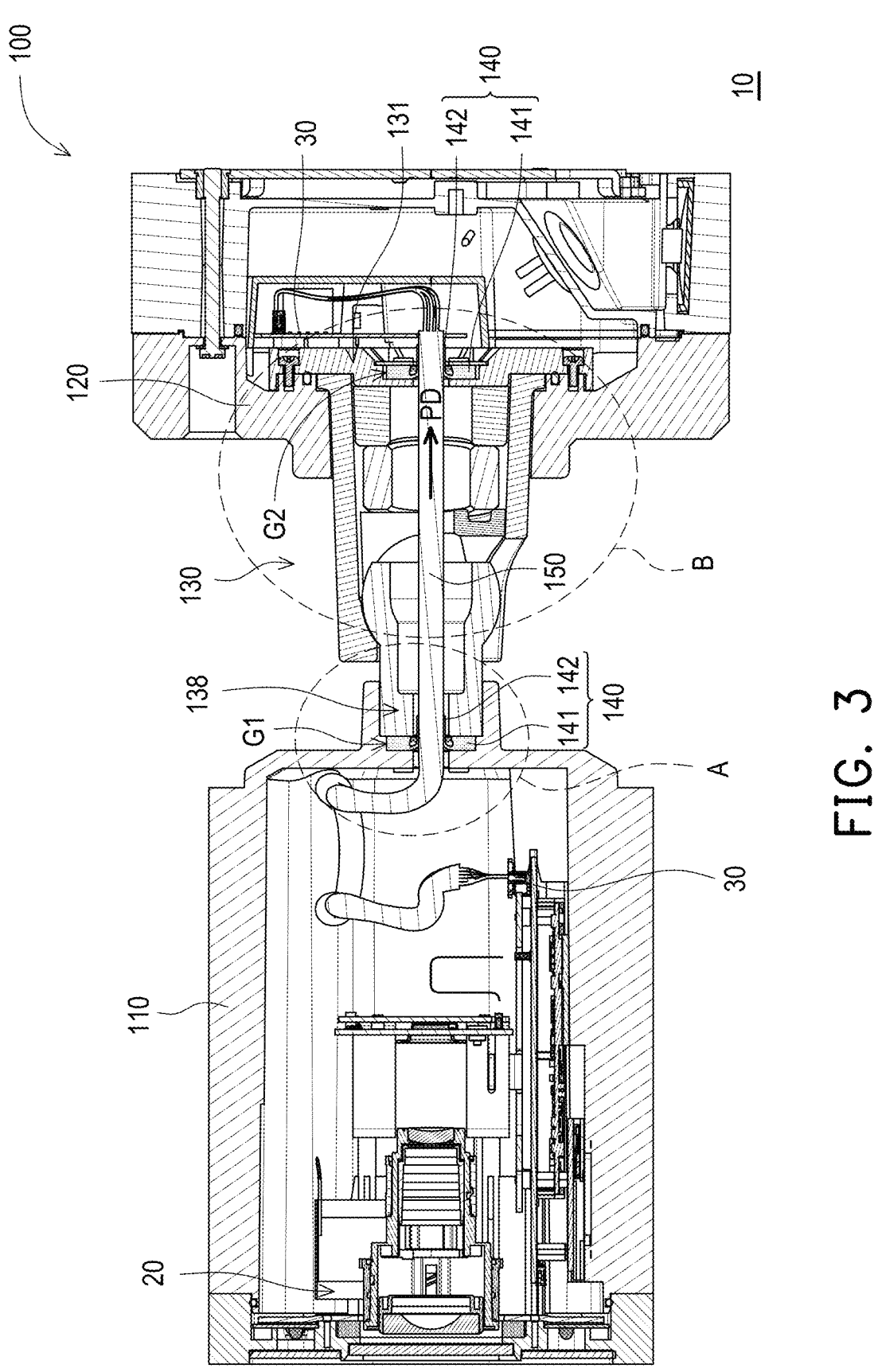
FIG. 3 is a cross-sectional view of the image capturing module of FIG. 2.

FIG. 1 is a perspective view of an image capturing module according to an embodiment of the present invention. FIG. 2 is a side view of the image capturing module of FIG. 1. FIG. 3 is a cross-sectional view of the image capturing module of FIG. 2. Referring to FIG. 1 to FIG. 3, the image capturing module 10 of the embodiment is, for example, an outdoor monitor. The image capturing module 10 includes a rotating base 100 and an image capturing unit 20. The image capturing module 10 can capture images of the external environment through the image capturing unit 20, and adjust the position and angle of the image capturing unit 20 through the rotating base 100, but the application scope of the image capturing module 10 is not limited thereto.

The rotating base 100 of the embodiment includes a first housing 110, a second housing 120, a rotating assembly 130, two sealing members 140 (FIG. 3) and an electronic cable 150 (FIG. 3). The image capturing unit 20 is disposed in the first housing 110. The rotating assembly 130 is connected between the first housing 110 and the second housing 120, wherein a connection end 131 of the rotating assembly 130 is connected to the second housing 120 and the other connecting end 138 of the rotating assembly 130 is connected to the first housing 110. Besides, the image capturing module 10 further includes two circuit boards 30. The two circuit boards 30 are respectively arranged inside the first housing 110 and the second housing 120. The two circuit boards 30 are electrically connected through the electronic cable 150.

Figure 4B:
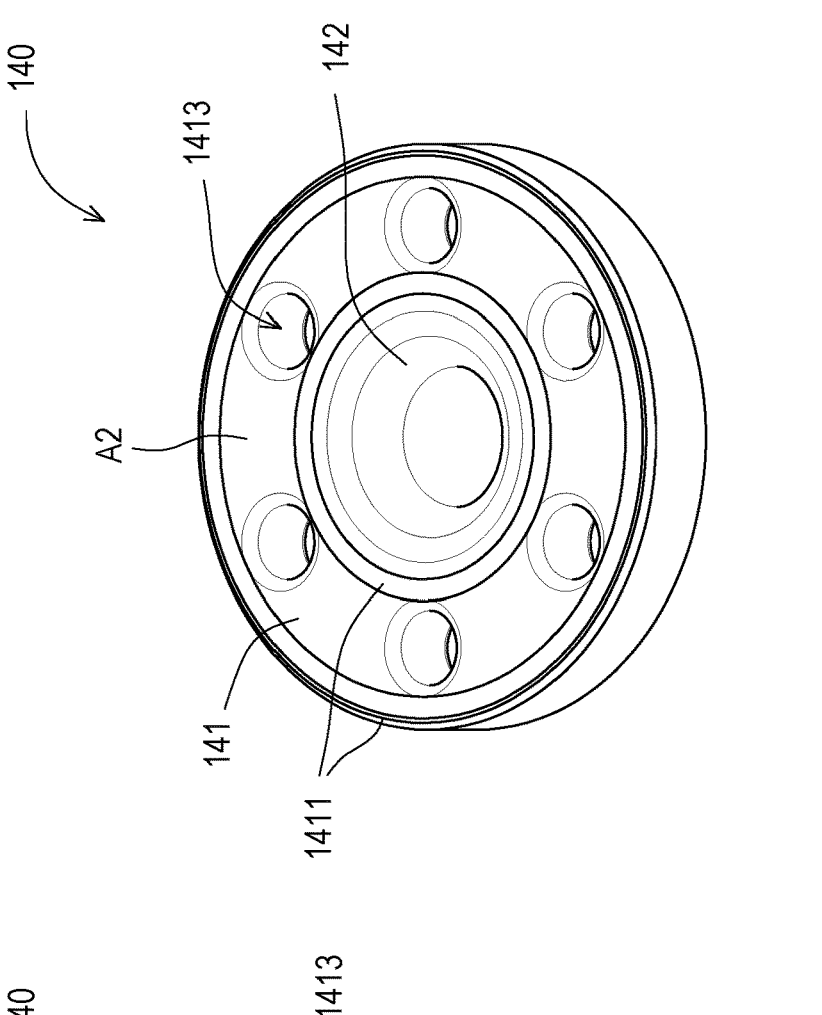
FIG. 4B is a perspective view of the sealing member of FIG. 4A from another perspective.
Figure 4A:
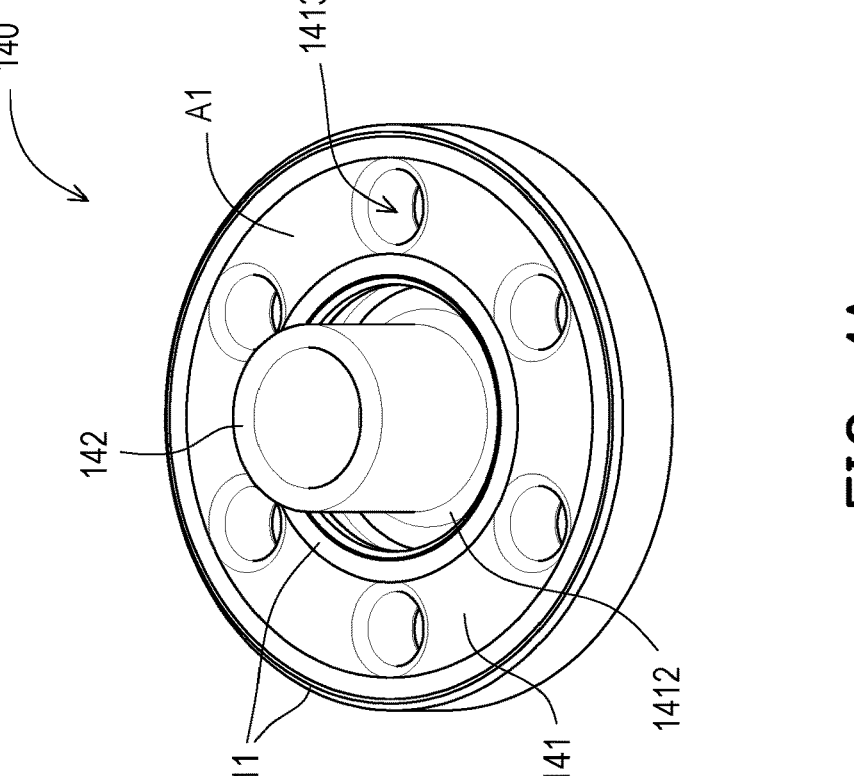
FIG. 4A is a perspective view of the sealing member of FIG. 3.
Figure 5A:
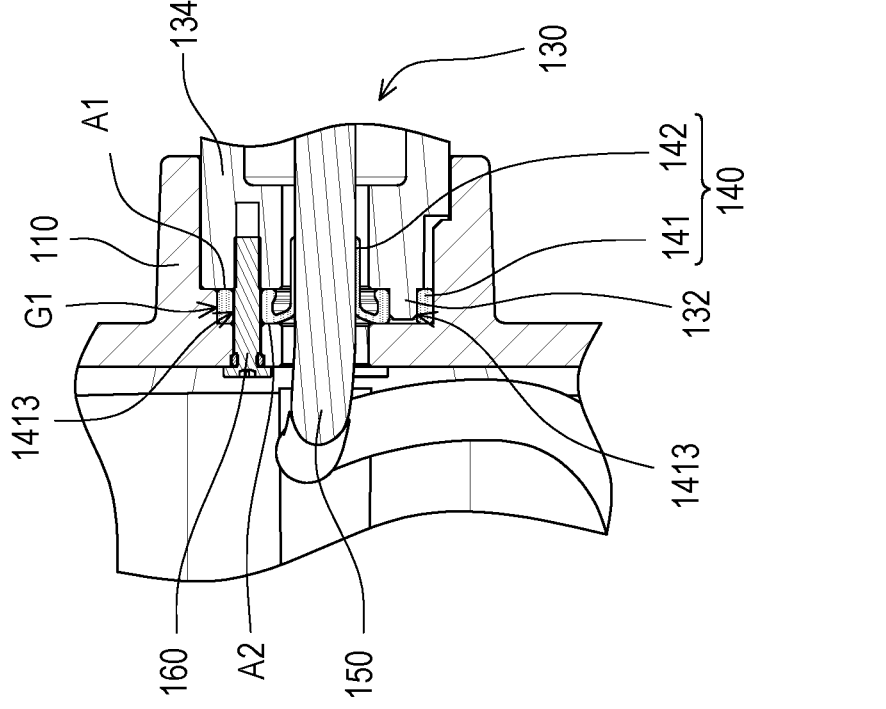
FIG. 5A is a partial cross-section of the rotating base of FIG. 3 in area A.
Figure 5B:
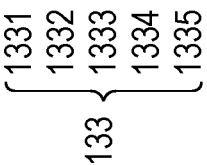
FIG. 5B is a partial cross-section of the rotating base of FIG. 3 in area B.

FIG. 4A is a perspective view of the sealing member of FIG. 3. FIG. 4B is a perspective view of the sealing member of FIG. 4A from another perspective. FIG. 5A is a partial cross-section of the rotating base of FIG. 3 in area A. FIG. 5B is a partial cross-section of the rotating base of FIG. 3 in area B. Referring to FIG. 4A and FIG. 4B first, each sealing members 140 includes a main part 141 and a tube-shaped part 142. The main part 141 is an annular structure. The tube-shaped part 142 is connected to the main part 141 and extends outward from the center of the main part 141. The main part 141 of the two sealing members 140 is respectively disposed between the first housing 110 and the rotating assembly 130 as shown in FIG. 5A and is disposed in the second housing 120 and between the internal space of the second housing 120 and the rotating assembly 130 as shown in FIG. 5B.

In the embodiment, the number of the sealing members 140 is two as mentioned above, but the number of the sealing members 140 is not limited thereto. In other embodiments, users can set the sealing members 140 where waterproofing is required according to actual waterproofing needs. For example, when the circuit boards 30 are only disposed inside the first housing 110 or the second housing 120, the sealing member 140 may be disposed only between the first housing 110 and the rotating assembly 130 or the sealing member 140 may be disposed only in the second housing 120. In the embodiment, the main part 141 of one sealing member 140 is sealed in a gap G1 between the rotating assembly 130 and the first housing 110 as shown in FIG. 5A, and the main part 141 of the other sealing member 140 is sealed in a gap G2 of the rotating assembly 130 at the connecting end 131 as shown in FIG. 5B.

It should be noted that, the shape and thickness of the annular structure of the main part 141 can be adjusted according to the shape and size of the gaps G1 and G2 to achieve good waterproofing effect. However, the present invention does not limit the shape and thickness of the annular structure of the main part 141.

Based on the above, the electronic cable 150 extends from the inside of the first housing 110 to the inside of the second housing 120 through the rotating assembly 130. Moreover, the electronic cable 150 passes through the tube-shaped part 142 and closely abuts the inner wall of the tube-shaped part 142.

As mentioned above, in the rotating base 100 of the embodiment, the sealing member 140 is disposed between the first housing 110 and/or the second housing 120 and the rotating assembly 130, and the sealing member 140 has the tube-shaped part 142 used to cover the electronic cable 150. Therefore, the tight combination of the electronic cable 150 and the tube-shaped part 142 can prevent external water from entering the first housing 110 and the second housing 120, thereby making the rotating base 100 have good waterproof properties. In addition, since the rotating base 100 is waterproofed by setting the sealing member 140 rather than in a gluing manner, it is easy to disassemble and rework. Moreover, the embodiment can achieve a waterproof effect by arranging the sealing member 140 in the above manner at the connection between the first housing 110 and/or the second housing 120 and the rotating assembly 130 rather than completely covering the electronic cable 150 with a waterproof sleeve in the rotating base 100. Therefore, it has the effect of saving material cost and easy assembly.

In the embodiment, the material of the sealing member 140 is, for example, rubber or other elastic materials, but the present invention is not limited to the material of the sealing members 140.

The structure of the rotating base 100 will be described in more detail below. Referring to FIG. 5A, the rotating base 100 of the embodiment further includes at least one fastener 160. The first housing 110 and the rotating assembly 130 are fastened to each other through the fastener 160. Besides, the main part 141 of the sealing member 140 disposed between the first housing 110 and the rotating assembly 130 has a plurality of through holes 1413 as shown in FIG. 4A. When the fastener 160 fastens the first housing 110 and the rotating assembly 130 to each other, the fastener 160 may pass through one of the through holes 1413. Furthermore, the rotating assembly 130 has at least one positioning post 132. The positioning post 132 is disposed at another one of the through holes 1413 to locate the sealing member 140.

In the embodiment, the main part 141 has six through holes 1413. These through holes 1413 are equidistantly located around the main part 141 and surround the tube-shaped part 142. However, the number and position of the through holes 1413 are not limited thereto.

Referring to FIG. 5A and FIG. 5B, the rotating assembly 130 of the embodiment includes a fixed structure 133, a rotating member 134, a housing 135 and an adjusting member 136. The rotating member 134 is fixed to the first housing 110 by the fastener 160. The fixed structure 133 is fixed to the second housing 120 by a fastener 170. The rotating member 134 is movably connected to the fixed structure 133. The adjusting member 136 is rotatably arranged in the housing 135.

In the embodiment, the adjusting member 136 is, for example, provided with a C-shaped buckle 137 at a portion of the adjusting member 136 close to the inside of the housing 135, so that the adjusting member 136 is rotatably arranged in the housing 135, but the present invention does not limit the fixing method of the adjusting member 136.

Referring to FIG. 5B, the fixed structure 133 also has a ball joint slot 1331, a base 1332, an abutting structure 1333, a fixed plate 1334 and a fixed piece 1335. The rotating member 134 has a ball joint head 1341. The ball joint head 1341 is connected to the ball joint slot 1331 in a ball joint manner and is movably connected to the base 1332. The abutting structure 1333 is disposed between the second housing 120 and the base 1332, and one end of the abutting structure 1333 towards the base 1332. The fixed plate 1334 is fixed to the second housing 120 by the fastener 170, and the fixed plate 1334 stops the other end of the abutting structure 1333. The abutting structure 1333 pushes the base 1332 toward the rotating member 134 along a first direction D1. The fixed piece 1335 is fixed to the fixed plate 1334 by a fastener 180.

In addition, the abutting structure 1333 includes a first pressing block P1 and a second pressing block P2. The adjusting member 136 is screwed on the first pressing block P1 and is adapted to rotate so as to drive the first pressing block P1 to move along a second direction D2. The first pressing block P1 is movably disposed between the base 1332 and the second pressing block P2 along the second direction D2 and has a first inclined surface S1 inclined to the second direction D2. The second pressing block P2 has a second inclined surface S2 parallel to and bearing on the first inclined surface S1. The first pressing block P1 is adapted to move along the second direction D2 to cause the first inclined surface S1 to move along the second inclined surface S2, thereby changing the abutting force of the abutting structure 1333 against the base 1332 along the first direction D1.

For example, when the first pressing block P1 moves along the second direction D2, the force pushing each other between the first inclined surface S1 and the second inclined surface S2 along the first direction D1 increases, and then the abutting force of the abutting structure 1333 against the base 1332 along the first direction D1 may become larger. Therefore, the fixing force between the ball joint head 1341 and the ball joint slot 1331 becomes larger to fix the position and angle of the image capturing unit 20 as shown in FIG. 1. In contrast, when the first pressing block P1 moves in the opposite direction of the second direction D2, the force pushing each other between the first inclined surface S1 and the second inclined surface S2 along the first direction D1 decreases, and then the abutting force of the abutting structure 1333 against the base 1332 along the first direction D1 may become smaller. Therefore, the fixing force between the ball joint head 1341 and the ball joint slot 1331 becomes smaller, allowing the user to easily adjust the position and angle of the image capturing unit 20.

In the embodiment, the electronic cable 150 is adapted to pass through the tube-shaped part 142 of one sealing member 140 and the tube-shaped part 142 of the other sealing member 140 sequentially along a passing direction PD during assembly. Correspondingly, the tube-shaped part 142 of the two sealing members 140 both extend from the corresponding main part 141 along the passing direction PD. That is, the tube-shaped part 142 of the two sealing members 140 extends in the same direction, such a design can improve the convenience and efficiency of the electronic cable 150 passing through the tube-shaped part 142. It should be noted that, in the embodiment, the passing direction PD is parallel to the first direction D1, and the first direction D1 is perpendicular to the second direction D2. However, the present invention does not limit the relative relationship between the passing direction PD, the first direction D1 and the second direction D2.

In the embodiment, in order for the sealing member 140 to reliably exhibit the sealing effect, the main part 141 has at least one annular flange 1411 (as shown in FIG. 4A, FIG. 4B). The annular flanges 1411 surround the tube-shaped part 142 and are compressed by at least one of the first housing 110 and the rotating assembly 130 as shown in FIG. 5A, and are compressed by at least one of the fixed piece 1335 and the fixed plate 1334 as shown in FIG. 5B. Specifically, the size of the sealing member 140 of the embodiment can be designed as follows. In the absence of the annular flange 1411, a first surface A1 of the main part 141 of one sealing member 140 is supported by the rotating member 134 without being compressed and a second surface A2 is supported by the first housing 110 without being compressed as shown in FIG. 5A. And the first surface A1 of the main part 141 of the other sealing member 140 is supported by the fixed piece 1335 without being compressed and the second surface A2 is supported by the fixed plate 1334 without being compressed as shown in FIG. 5B. Therefore, the annular flange additionally formed on the main part 141 can be reliably compressed to provide a sealing effect.

In the embodiment, the number of the annular flange 1411 of the main part 141 of each sealing members 140 is four. Each side of the main part 141 has two annular flanges 1411. The two annular flanges 1411 are arranged concentrically. The number of the annular flanges 1411 is not limited thereto.

In addition, the main part 141 of the embodiment has an annular groove 1412 as shown in FIG. 4A. The annular groove 1412 surrounds the tube-shaped part 142. In the embodiment, by forming the annular groove 1412 in the main part 141, the tube-shaped part 142 can have sufficient elastic deformation capability to cope with the pulling during assembly and/or operation of the rotating assembly 130, so that good sealing can be maintained between the electronic cable 150 and the tube-shaped part 142.

On the other hand, as shown in FIG. 5B, the rotating base 100 of the embodiment also includes a waterproof ring 190, which is disposed between the second housing 120 and the fixed plate 1334 to prevent external water from entering the interior of the second housing 120 through the gap between the second housing 120 and the fixed plate 1334.

In summary, in the rotating base of the present invention, the sealing member is disposed between the first housing and/or the second housing and the rotating assembly, and the sealing member has the tube-shaped part used to cover the electronic cable. Therefore, the tight combination of the electronic cable and the tube-shaped part can prevent external water from entering the first housing and the second housing, thereby making the rotating base have good waterproof properties. In addition, since the rotating base is waterproofed by setting the sealing member rather than in a gluing manner, it is easy to disassemble and rework. Moreover, the present invention can achieve a waterproof effect by arranging the sealing member in the above manner at the connection between the first housing and/or the second housing and the rotating assembly without the need to completely cover the electronic cable with a waterproof sleeve in the rotating base. Therefore, it has the effect of saving material cost and easy assembly.

Although the present invention has been disclosed as above with embodiments, it is not intended to limit the present invention. Any person with ordinary knowledge in the art, without departing from the spirit and scope of the present invention, can make some changes. Therefore, the protection scope of the present invention shall be determined by the scope of the claims.

What is claimed is:

1. A rotating base, comprising:
a first housing;
a second housing;
a rotating assembly, connected between the first housing and the second housing;

at least one sealing member, comprises a main part and a tube-shaped part, wherein the main part is disposed between at least one of the first housing and the second housing and the rotating assembly, the tube-shaped part is connected to the main part; and
an electronic cable, extended to an internal of the second housing from an internal of the first housing through the rotating assembly, wherein the electronic cable is disposed through the tube-shaped part and pressed tightly to an interior wall of the tube-shaped part,
wherein the main part has at least one through hole, the rotating assembly has at least one positioning post, the at least one positioning post is disposed at the at least one through hole.

2. The rotating base according to claim 1, wherein the at least one sealing member comprises two sealing members, one sealing member is disposed between the first housing and the rotating assembly, the other sealing member is disposed between the second housing and the rotating assembly.

3. The rotating base according to claim 2, wherein the electronic cable is adapted to pass through the tube-shaped part of one sealing member and the tube-shaped part of the other sealing member along a passing direction, the tube-shaped part of each sealing members extends from the main part along the passing direction.

4. The rotating base according to claim 1, wherein the main part is sealed to a gap between the rotating assembly and the first housing.

5. The rotating base according to claim 1, wherein a connecting end of the rotating assembly is connected to the second housing, the main part is sealed to a gap of the rotating assembly at the connecting end.

6. The rotating base according to claim 1, wherein the main part has at least one annular flange, the at least one annular flange surrounds the tube-shaped part and is compressed by at least one of the first housing and the rotating assembly.

7. The rotating base according to claim 6, wherein the at least one annular flange comprises two annular flanges, the two annular flanges are arranged concentrically.

8. The rotating base according to claim 1, wherein the main part has an annular groove, the annular groove surrounds the tube-shaped part.

9. The rotating base according to claim 1, further comprising at least one fastener, wherein the first housing and the rotating assembly are fastened to each other through the at least one fastener, the main part has at least one through hole, the at least one fastener passes through the at least one through hole.

10. The rotating base according to claim 1, wherein the rotating assembly comprises a fixed structure and a rotating member, the rotating member is fixed to the first housing, the fixed structure is fixed to the second housing, the rotating member is movably connected to the fixed structure.

11. The rotating base according to claim 10, wherein the main part of the at least one sealing member is disposed between the first housing and the rotating member.

12. The rotating base according to claim 10, wherein the main part of the at least one sealing member is disposed on the fixed structure.

13. The rotating base according to claim 10, wherein the fixed structure has a ball joint slot, the rotating member has a ball joint head, the ball joint head is connected to the ball joint slot in a ball joint manner.

14. The rotating base according to claim 10, wherein the fixed structure comprises a base and an abutting structure, the rotating member is movably connected to the base, the abutting structure is disposed between the second housing and the base and pushes the base toward the rotating member along a first direction.

15. The rotating base according to claim 14, wherein the abutting structure comprises a first pressing block and a second pressing block, the first pressing block is movably disposed between the base and the second pressing block along a second direction and has a first inclined surface inclined to the second direction, the second pressing block has a second inclined surface parallel to and bearing on the first inclined surface, the first pressing block is adapted to move along the second direction to cause the first inclined surface to move along the second inclined surface, thereby changing the abutting force of the abutting structure against the base along the first direction.

16. The rotating base according to claim 15, wherein the rotating assembly further comprises a housing and an adjusting member, the adjusting member is rotatably arranged in the housing and screwed on the first pressing block, the adjusting member is adapted to rotate and drive the first pressing block to move along the second direction.

17. The rotating base according to claim 14, wherein the fixed structure further comprises a fixed plate, the fixed plate is fixed to the second housing, one end of the abutting structure towards the base, the fixed plate stops the other end of the abutting structure.

18. The rotating base according to claim 17, wherein the fixed structure further comprises a fixed piece, the fixed piece is fixed to the fixed plate, the main part of the at least one sealing member is sealed to the fixed piece and the fixed plate.

19. An image capturing module, comprising:
a rotating base as described in claim 1; and
an image capturing unit, disposed in the first housing.

20. A rotating base, comprising:
a first housing;
a second housing;
a rotating assembly, connected between the first housing and the second housing;
at least one sealing member, comprises a main part and a tube-shaped part, wherein the main part is disposed between at least one of the first housing and the second housing and the rotating assembly, the tube-shaped part is connected to the main part; and
an electronic cable, extended to an internal of the second housing from an internal of the first housing through the rotating assembly, wherein the electronic cable is disposed through the tube-shaped part and pressed tightly to an interior wall of the tube-shaped part,
wherein the abutting structure comprises a first pressing block and a second pressing block, the first pressing block is movably disposed between the base and the second pressing block along a second direction and has a first inclined surface inclined to the second direction, the second pressing block has a second inclined surface parallel to and bearing on the first inclined surface, the first pressing block is adapted to move along the second direction to cause the first inclined surface to move along the second inclined surface, thereby changing the abutting force of the abutting structure against the base along the first direction.

* * * * *